Figure 1:
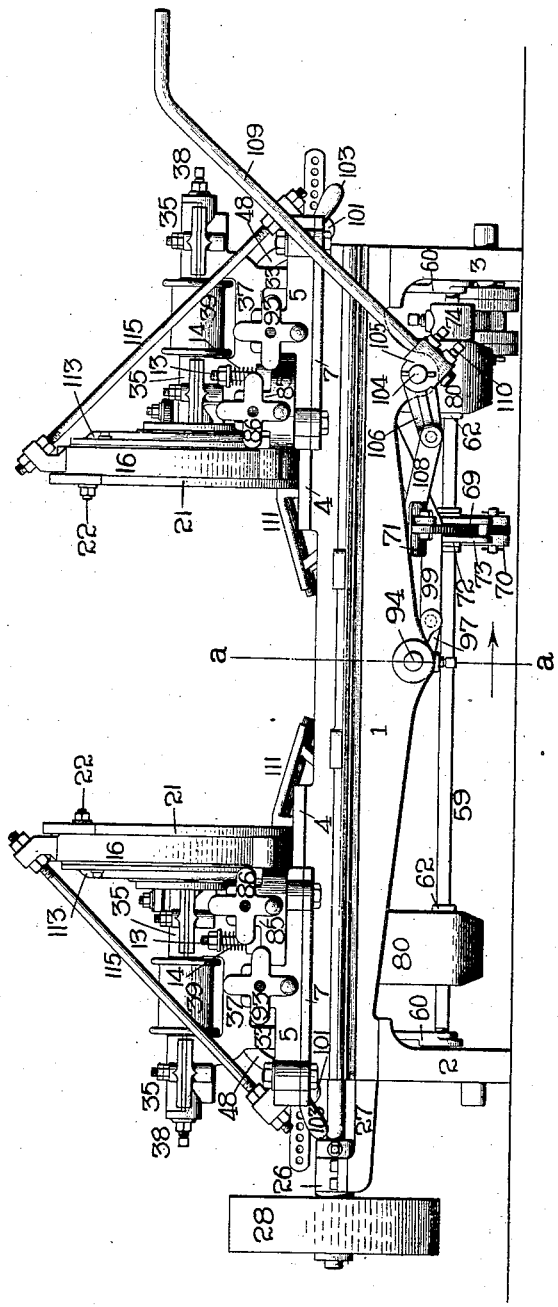

E. F. BEUGLER.
MACHINE FOR CHAMFERING AND CROZING BARRELS.
APPLICATION FILED FEB. 2, 1907.

915,065.

Patented Mar. 16, 1909.

Witnesses.

Edwin F. Beugler. Inventor.

E. F. BEUGLER.
MACHINE FOR CHAMFERING AND CROZING BARRELS.
APPLICATION FILED FEB. 2, 1907.

915,065.

Patented Mar. 16, 1909.
9 SHEETS—SHEET 2.

Witnesses.
L. M. Sangster.
George A. Neubauer.

Edwin F. Beugler. Inventor.
By A. J. Sangster
Attorney.

E. F. BEUGLER.
MACHINE FOR CHAMFERING AND CROZING BARRELS.
APPLICATION FILED FEB. 2, 1907.

915,065.

Patented Mar. 16, 1909.
9 SHEETS—SHEET 3.

Witnesses
L. M. Sangster.
George A. Neubauer.

Edwin F. Beugler, Inventor.
By A. J. Sangster, Attorney.

E. F. BEUGLER.
MACHINE FOR CHAMFERING AND CROZING BARRELS.
APPLICATION FILED FEB. 2, 1907.

915,065.

Patented Mar. 16, 1909.
9 SHEETS—SHEET 4.

Witnesses.
L. M. Sangster.
George A. Neubauer.

Inventor.
Edwin F. Beugler
By A. J. Sangster
Attorney.

E. F. BEUGLER.
MACHINE FOR CHAMFERING AND CROZING BARRELS.
APPLICATION FILED FEB. 2, 1907.

915,065.

Patented Mar. 16, 1909.
9 SHEETS—SHEET 5.

Witnesses.
L. M. Sangster.
George A. Neubauer.

Inventor.
Edwin F. Beugler.
By A. J. Hampton
Attorney.

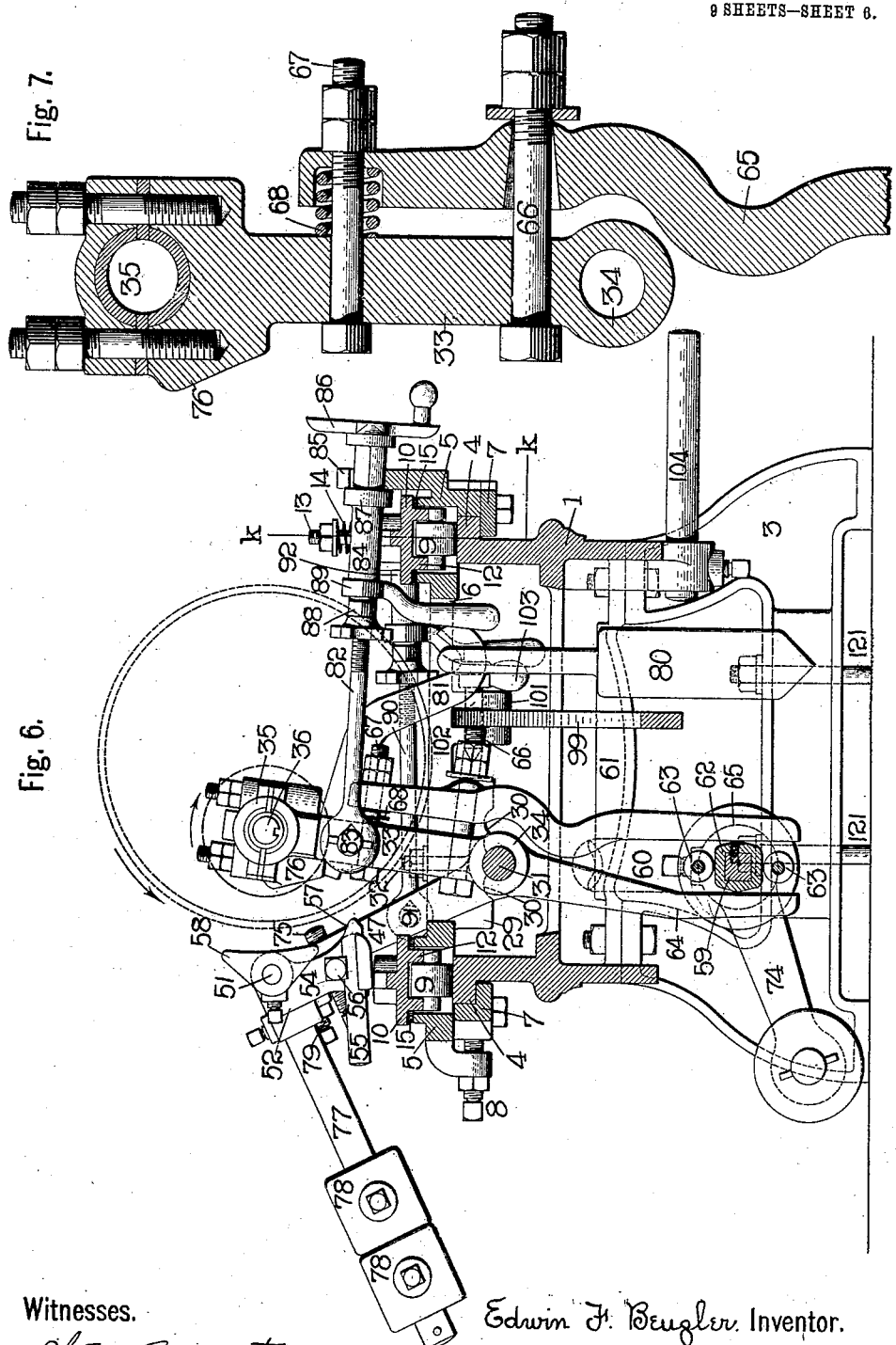

E. F. BEUGLER.
MACHINE FOR CHAMFERING AND CROZING BARRELS.
APPLICATION FILED FEB. 2, 1907.
915,065.
Patented Mar. 16, 1909.
9 SHEETS—SHEET 7.
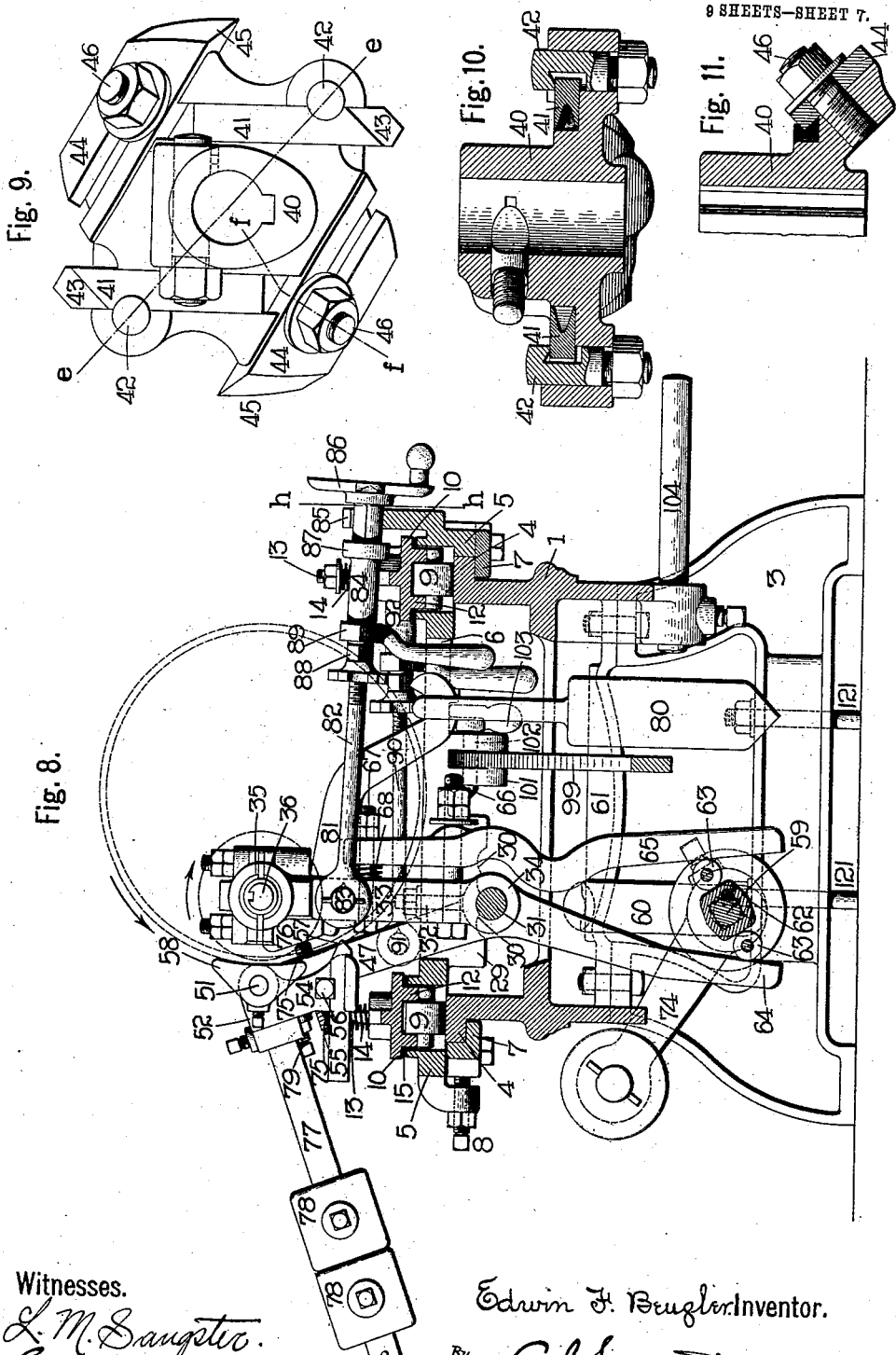
Witnesses.
L. M. Sangster.
George A. Neubauer.
Edwin F. Beugler, Inventor.
By A. J. Sangster, Attorney.

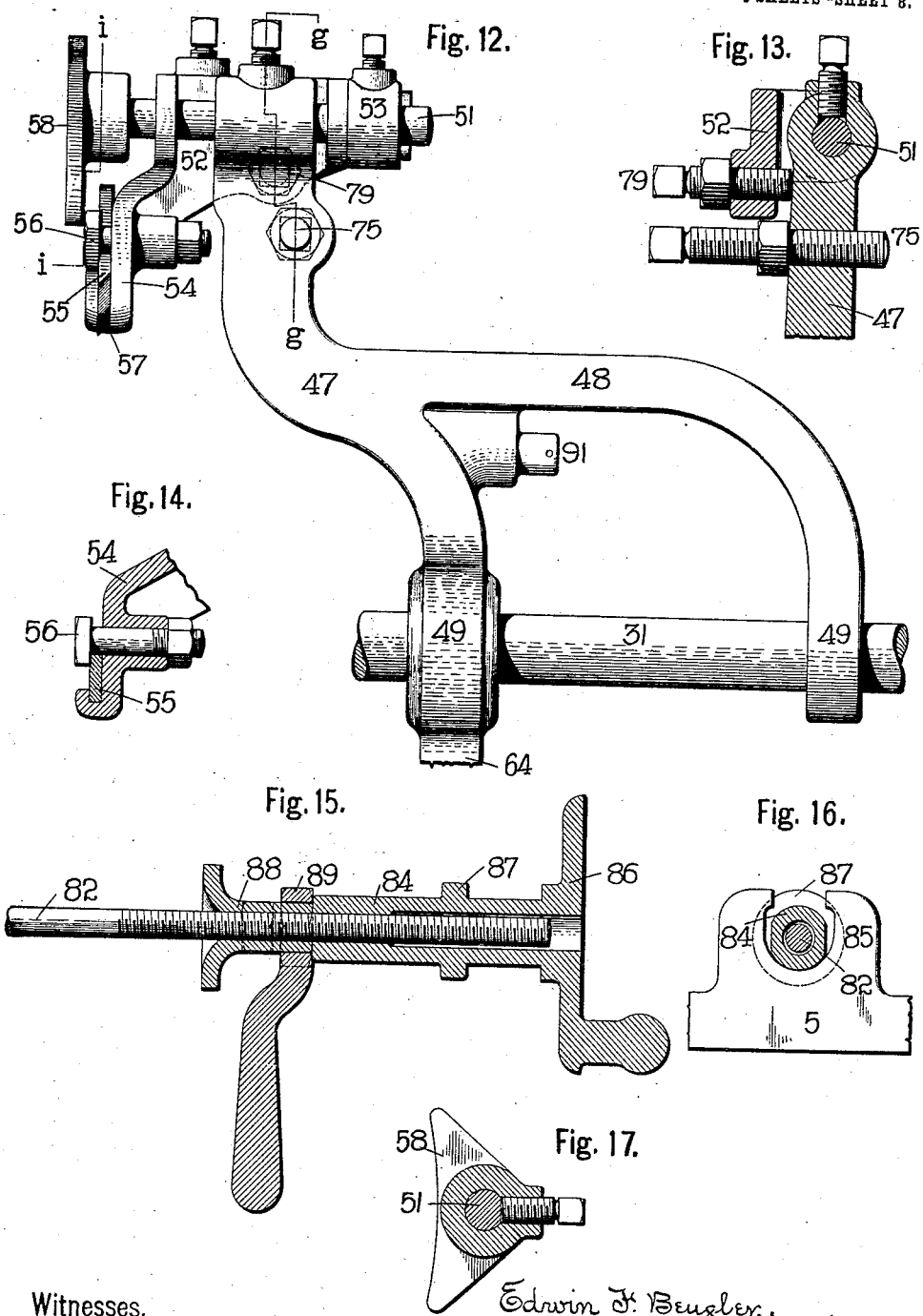

E. F. BEUGLER.
MACHINE FOR CHAMFERING AND CROZING BARRELS.
APPLICATION FILED FEB. 2, 1907.
915,065.
Patented Mar. 16, 1909.
9 SHEETS—SHEET 9.
Fig. 18.
Fig. 20.
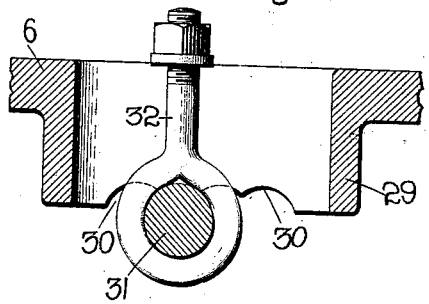
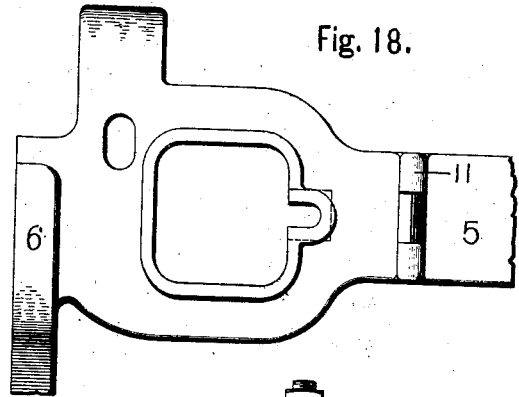
Fig. 19.
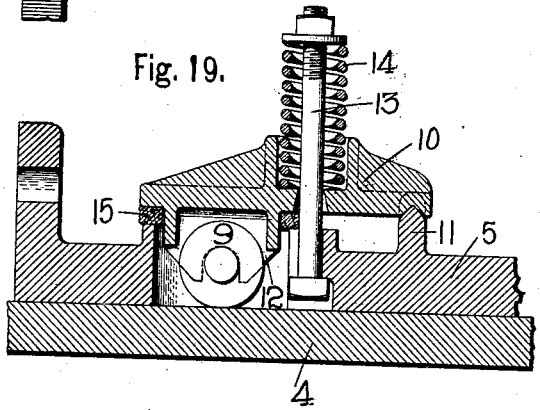
Fig. 21.
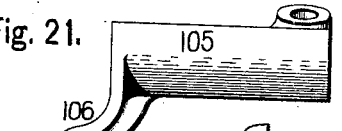
Fig. 22.
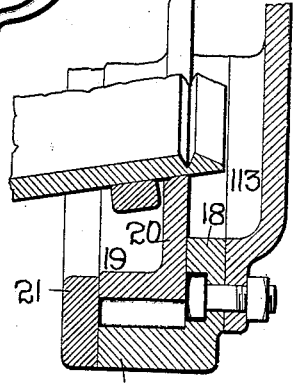
Fig. 23.
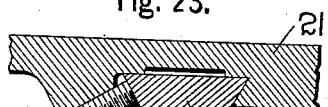
Fig. 24.
Fig. 25.
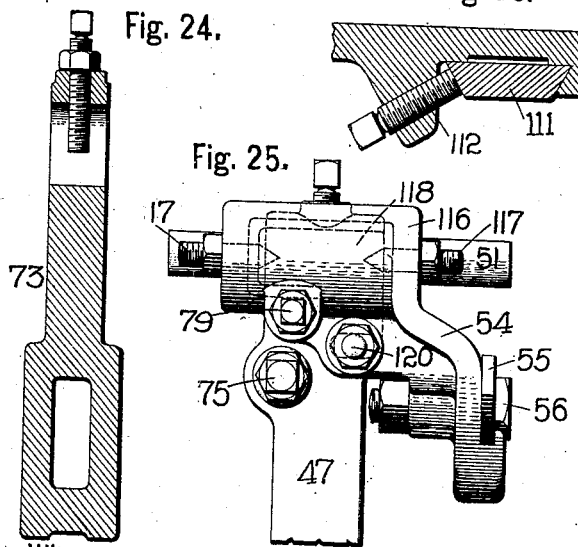
Fig. 26.
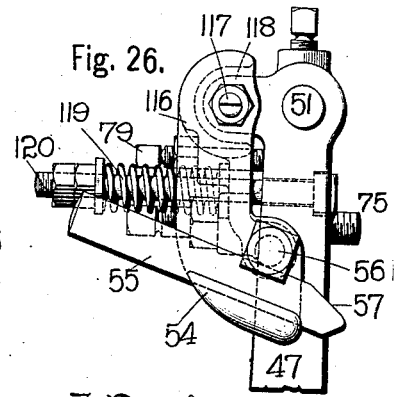
Witnesses.
L. M. Sangster.
George A. Neubauer
Edwin F. Beugler, Inventor.
By A. J. Sangster
Attorney.

UNITED STATES PATENT OFFICE.

EDWIN F. BEUGLER, OF BUFFALO, NEW YORK, ASSIGNOR TO EDWARD B. HOLMES, OF BUFFALO, NEW YORK.

MACHINE FOR CHAMFERING AND CROZING BARRELS.

No. 915,065.      Specification of Letters Patent.      Patented March 16, 1909.

Application filed February 2, 1907. Serial No. 355,364.

*To all whom it may concern:*

Be it known that I, EDWIN F. BEUGLER, a citizen of the United States, residing at Buffalo, in the county of Erie and State of New York, have invented a certain new and useful Improvement in Machines for Chamfering and Crozing Barrels, of which the following is a specification.

This invention relates to an improved machine for chamfering and crozing barrels and belongs to that class of machines in which both ends of the barrel are operated upon simultaneously.

The principal object of the invention is to obviate the danger, so prevalent in machines of this kind, of cutting through the staves when forming the croze, and thus ruining the barrel.

Another object of the invention is to produce a machine capable of operating upon different sized barrels, and at a high rate of speed.

The invention also relates to certain details of construction, all of which will be fully and clearly hereinafter described and claimed, reference being had to the accompanying drawings, in which,—

Figure 2:
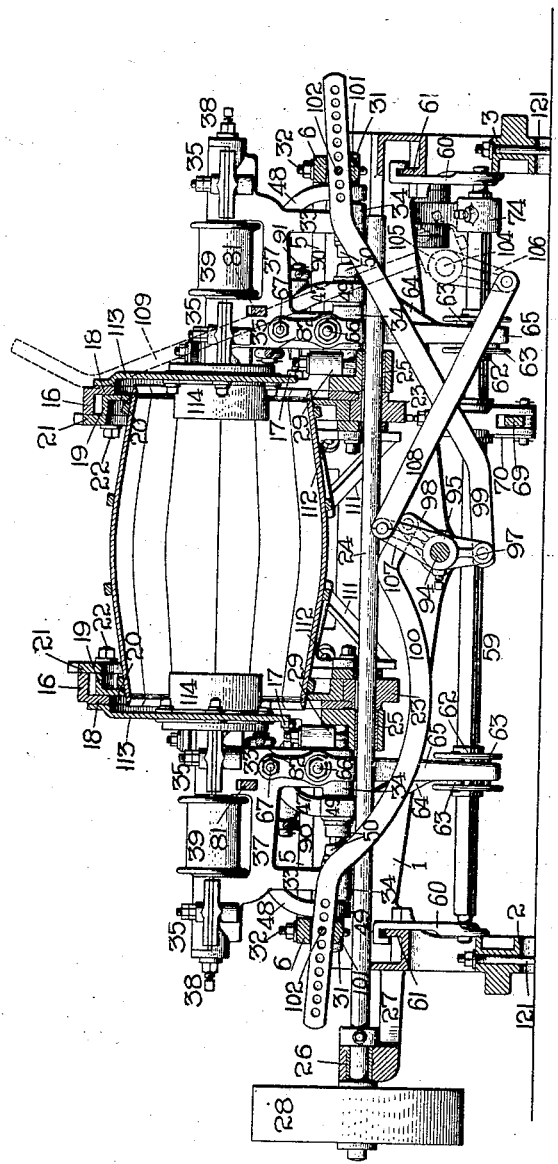
Figure 3:
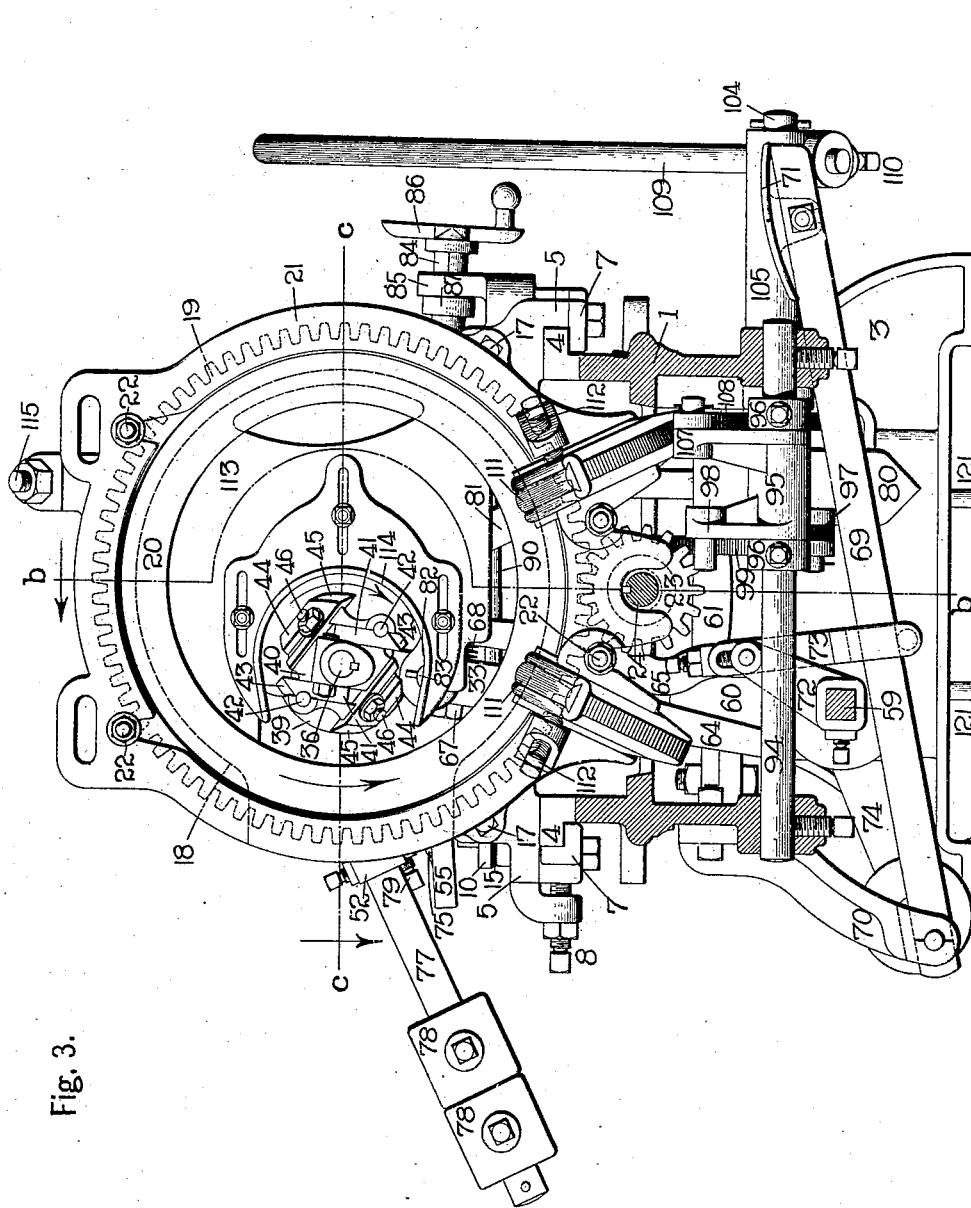
Figure 4:
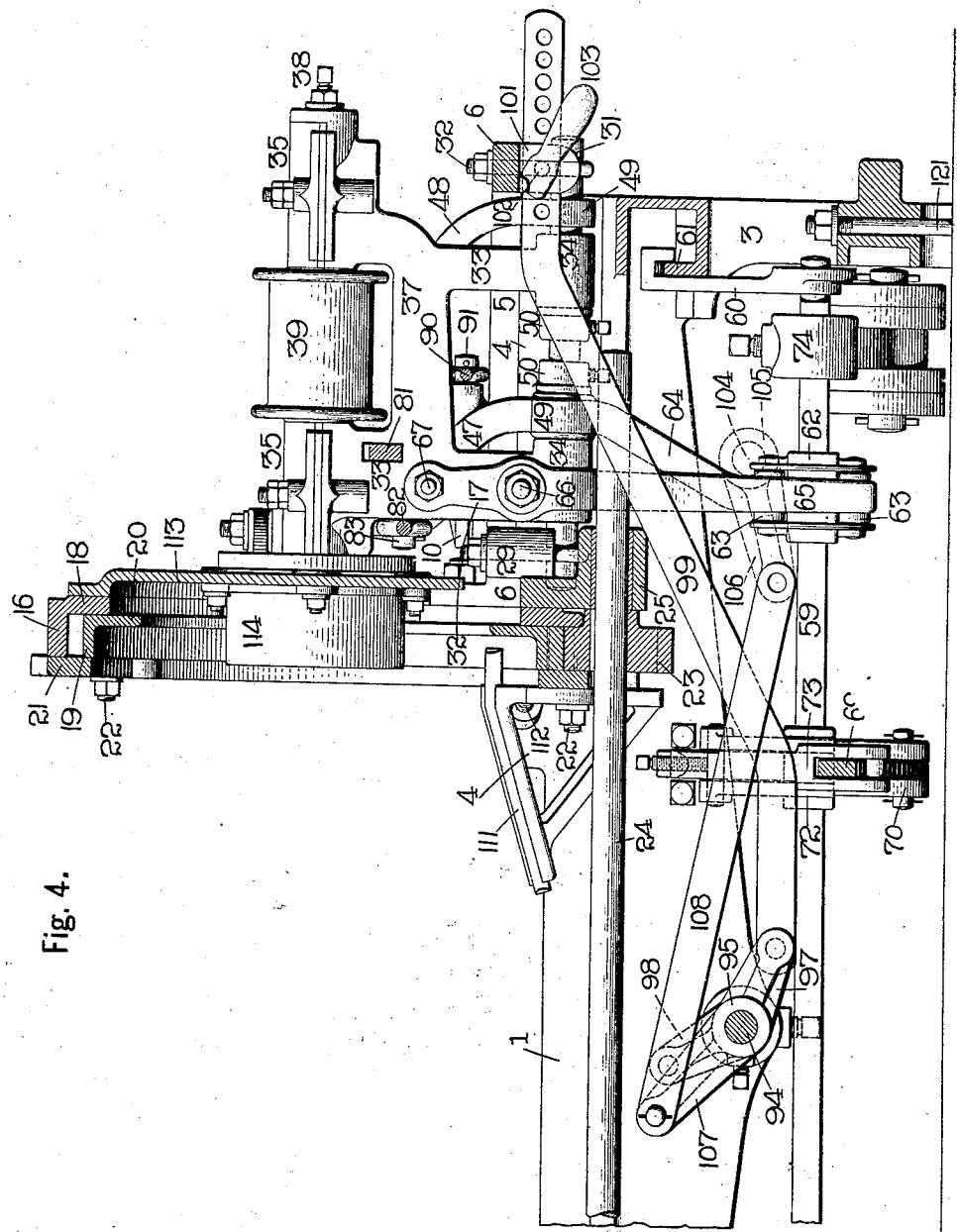
Figure 5:
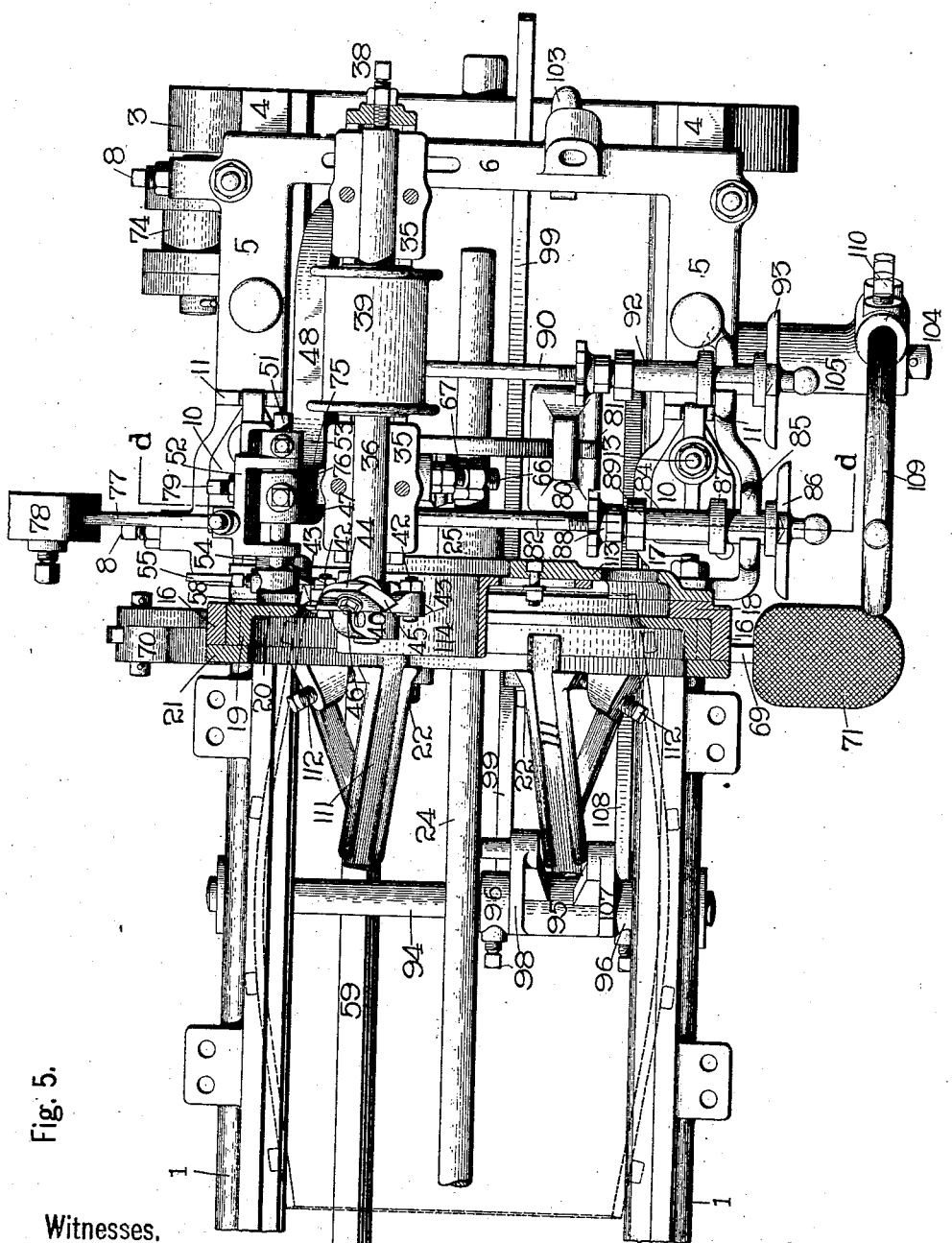

Figure 1 is a front elevation of the machine. Fig. 2 is a central longitudinal section through the machine, showing a barrel in place therein, and the mechanism in position to chamfer and croze the same. Fig. 3 is an enlarged transverse section on line $a\,a$, Fig. 1. Fig. 4 is a central vertical section on line $b\,b$, Fig. 3, the mechanism for operating the carriages being shown. Fig. 5 is a horizontal section on line $c\,c$, Fig. 3, showing the outline of a barrel in position in the machine, and the crozing and chamfering mechanism in position to operate upon the barrel. Fig. 6 is a transverse section on line $d\,d$, Fig. 5, with the mechanism in its normal position, the cutter head being represented by a dotted circle, and the outline of a barrel in position in the machine, being shown in dotted lines. Fig. 7 is an enlarged fragmentary transverse section through the swinging yoke frame that carries the cutter head. Fig. 8 is a view similar to Fig. 6, showing the mechanism in position to operate upon a barrel. Fig. 9 is an enlarged detached face view of the cutter head. Fig. 10 is a section on line $e\,e$, Fig. 9. Fig. 11 is a section on line $ff$, Fig. 9. Fig. 12 is an enlarged fragmentary front view of the swinging yoke carrying the lance knife. Fig. 13 is a fragmentary section through the swinging yoke and lance holder, on line $g\,g$, Fig. 12. Fig. 14 is a fragmentary transverse section through the lance knife and its holder, showing the means for securing the knife in place. Fig. 15 is an enlarged detached section on line $d\,d$, Fig. 5, through one of the adjustable screw bars for limiting the swinging movement of the chamfering and crozing mechanism. Fig. 16 is a transverse section through the same on line $h\,h$, Fig. 8, showing a fragment of the carriage. Fig. 17 is a transverse section on line $i\,i$, Fig. 12. Fig. 18 is an enlarged plan view of a fragment of one of the carriages. Fig. 19 is an enlarged fragmentary section on line $k\,k$, Fig. 6, through the carriage and the rail, showing the roller bearing. Fig. 20 is an enlarged fragmentary section through one of the carriages, showing the manner of supporting the shaft upon which the chamfering and crozing mechanism is supported. Fig. 21 is a detached side view of the sleeve and crank arm which is operated by the hand lever. Fig. 22 is an enlarged fragmentary section through one of the head stocks, showing a fragment of a barrel, crozed and chamfered, held in place therein. Fig. 23 is an enlarged fragmentary section through the retaining ring showing the manner of securing the barrel supports. Fig. 24 is an enlarged detached central vertical section through the link connecting the foot lever to the crank on the longitudinal rock shaft. Figs. 25 and 26, are rear and side views, respectively, of another form of lance holder carried by the swinging yoke.

In referring to the drawings for the details of construction, like numerals designate like parts.

The machine consists of a frame upon which are slidably mounted two sets of mechanisms between which the barrel is placed. Each of these sets of mechanisms has a cutter head which is adapted to be brought into contact with the interior surface of the barrel, near the ends thereof, by the operator, the cutter head being provided with knives which simultaneously cut the croze, and chamfer the edges of the barrel staves.

The frame consists of a rectangular member 1, which is horizontally supported upon two leg members 2 and 3, secured to the member 1 by bolts, see Figs. 4, 6 and 8. The top edges of the longitudinal portions of the rectangular frame member 1, for the greater part of their length are formed so as to constitute rails 4, upon which the carriages, and the crozing and chamfering mechanisms carried thereby, ride. As the two sets of crozing and chamfering mechanisms are practically duplicates of each other, but one set will be described, like parts on both sets being indicated by like numerals on the drawings, except where it is deemed necessary to indicate corresponding parts by different numerals to more clearly describe the construction or operation of the machine.

Each carriage consists of a substantially square shaped frame having longitudinal portions 5, and transverse portions 6, all formed in one integral piece, and gibs 7, secured by bolts to the under side of the longitudinal portions 5, thereof, so as to embrace the rails 4. One of the gibs 7, preferably that on the rear side of the carriage, is adjustably secured so as to provide for the taking up of wear, the fastening bolts being passed through elongated openings in the carriage, portion, and set screws 8, carried by lateral lugs on the portion 5, of the carriage, being provided for securing a fine adjustment of the gib, see Figs. 6 and 8.

In order to reduce friction between the carriage and the rails, the former is provided with roller bearings formed substantially as shown in Figs. 6, 8, 18 and 19. The longitudinal portions 5, of the carriage near the inner transverse portion 6, are widened, and each is provided with a vertical opening in which a roller 9, having laterally projecting pins, is located; said roller being adapted to ride the rail 4. A horizontal plate 10, located vertically above each opening is fulcrumed at one end upon a transverse ridge 11, on the carriage portion, and is provided near its other end with depending flanges 12, which enter the opening and straddle the roller 9, bearing against the lateral pins. A screw bolt 13, having its head seated in a socket in the carriage, extends vertically upward through the carriage portion and through the plate 10, and has a heavy coiled spring 14, encircling its upper portion; the spring being held between the plate 10 and a washer on the bolt. It will be seen that by compressing the spring to the proper degree, by means of the nut on the upper end of the bolt, the weight of the carriage and its mechanism, can be partially borne by the roller 9, thus reducing the friction between the carriage and the rails. A packing 15, of wool felt may be placed between the plate 10, and the carriage portion 5, surrounding the opening in which the roller 9, is located.

Each carriage carries a head stock which grips one end of the barrel and holds it firmly while the croze is being cut and the edge of the barrel chamfered. In the following description of this part of the machine, reference will particularly be called to Figs. 1, 2, 3, 4, 5 and 22 of the drawings. A large ring 16, is secured by bolts 17, to the inner transverse portion 6, of the carriage in the manner shown in Figs. 3 and 5; said ring having an inwardly extending annular flange 18, formed integral therewith, adjacent to the carriage portion 6, see Fig. 4. A gear ring 19, is located within the ring 16, and has an inwardly extending flange 20, the edge of which is beveled or chamfered as shown in Fig. 22; and a retaining ring 21, is secured by bolts 22, to the edge of the ring 16, and serves to retain the gear ring 19, in place. The gear ring 19 fits snugly within the ring 16, the points of the teeth on said ring contacting with the inner surface of the ring 16, and forming the bearing. The gear ring 19, is rotated by means of a pinion 23, carried by a longitudinal shaft 24, located centrally beneath the head stock, see Figs. 3 and 4. This shaft is journaled in bearings 25 and 26, the bearing 25, being formed integral with the transverse portion 6, of the carriage, and the bearing 26, being located in a bracket 27, extending from the transverse portion of the rectangular frame 1, see Figs. 1 and 2. A pulley 28, is mounted upon the projecting end of the shaft 24, and may be connected to any suitable source of power by a belt. The pinion 23 is secured to the shaft 24 by a feather so as to have a longitudinal sliding movement thereon, see Fig. 4.

The crozing and chamfering mechanism is carried by the carriage and is constructed substantially as shown in Figs. 1 to 11 inclusive, and Figs. 15, 16 and 20, to which reference will be had in the following description. The transverse portions 6, of the carriage, are provided with enlargements 29, on their bottom surfaces, and these enlargements have their bottom surfaces provided with a series of concaved depressions 30, see Fig. 20. A shaft 31, has its ends seated in one of the concaved depressions 30, in each of the enlargements 29, and is supported by two eye bolts 32, which encircle the ends of the shaft and have their shanks passed vertically through slots in the enlargements 29. The eye bolts are drawn up by screw nuts screwed upon the upper ends of the shanks, to firmly seat the shaft ends in the concaved depressions 30, and rigidly fasten it in position. Two swinging yokes are carried by the shaft 31, one of which carries the cutter head and the other of which carries the lance knife for trimming the end of the barrel. The yoke which carries the cutter head is substantially H-shaped, the vertical portions 33, terminating at their lower extremities in hubs 34 through which the shaft 31 passes, and at their upper extremities in bearings 35, in which a shaft 36 is journaled. The horizontal portion 37, of the yoke connects the vertical portions 33, about midway between the hubs 34, and bearings 35, see Fig. 4. The cutter head is keyed to the inner end of the shaft 36, and a set screw 38, screwed through the end of the outer bearing 35, bears against the opposite end of the shaft 36, and prevents any longitudinal movement thereof, see Fig. 5. A pulley 39, is secured to the shaft 36, between the bearings 35, and is connected to a suitable source of power by a belt. The cutter head consists of a body 40, having parallel grooves on opposite sides of the central hub, in which cutters 41, are seated, said cutters being secured in place by bolts 42 in the manner shown in Fig. 10. The cutters 41, are longitudinally grooved and have V-shaped cutting edges 43, which enter the barrel staves and cut the croze, see Fig. 5. The chamfering knives 44, are located opposite each other and between the cutters 41, see Fig. 9. They are placed at an angle so that their cutting edges 45 will bevel or chamfer the inner edge of the end of the barrel. The chamfering knives 44 are fastened to the body of the cutter head by bolts 46, as shown in Fig. 11. The yoke which carries the lance knife consists of a main portion 47 and a strengthening brace 48, which connects with the main portion 47 at about the middle thereof, see Fig. 12. Hubs 49, are formed at the lower extremities of the main portion 47, and the brace 48, through which the shaft 31 passes. Collars 50 encircling the shaft 31, prevent end movement of the two yokes see Fig. 4. The upper end of the main portion 47, of the yoke that carries the lance knife, terminates in a boss in which a horizontal pin 51, is rigidly secured by a set screw.

A lance holder 52, formed substantially as shown in Figs. 5, 6, 8, 12, 13 and 14, is pivotally supported upon the projecting ends of the pin 51, being held in proper position thereon by a collar 53, see Figs. 5 and 12. The lance holder 52, has a depending arm 54, provided with a groove in which the lance knife 55 is seated, the knife being fastened in place by a bolt 56, in the manner shown in Figs. 12 and 14. The cutting edge 57 of the lance knife is formed as shown in Figs. 6 and 8. A stop block or rider 58, which contacts with the outer surface of the barrel is secured to the end of the pin 51, and limits the entrance of the lance knife 55, and the croze cutters 41, into the barrel staves. The rider 58, is fastened in place by a set screw, see Fig. 17, the pin 51, having a portion cut away to provide a plane surface for the set screw, so as to permit a slight rocking movement to the stop block or rider. The two yokes carrying the cutter head and the lance knife are swung toward each other by mechanism located beneath the carriages and operated by a foot lever. In the following description of this mechanism, reference will be had to Figs. 1 to 8, inclusive. A rock shaft 59, preferably square in cross section, has its ends journaled in bearings formed in swinging hangers 60, the upper ends of which are hook shaped and provided with curved bearing surfaces. These hangers 60 are supported by the transverse portions of the rectangular frame 1, in the manner shown in Figs. 4, 6 and 8, said portions having vertical ridges 61, over which the hangers 60, hook, the curved bearing surfaces thereof contacting with the straight top edges of the ridges 61. The hangers 60, are placed so that the shaft 59 is vertically beneath the shaft 31, see Figs. 6 and 8. A sleeve 62, having an annular flange near each end, is mounted upon the square rock shaft 59, so as to have a longitudinal sliding movement thereon; and two rollers 63, placed oppositely to each other and extending parallel to the rock shaft, are supported on pins between the flanges. Each of the swinging yokes has a depending arm which extends to within operative proximity to the rollers 63 on the sliding sleeve. The arm 64, depending from the yoke which carries the lance knife hangs in the rear of the sliding sleeve 62, as shown in Figs. 4, 6 and 8. It depends from, and is integrally formed with, the hub 49, at the lower end of the main portion 47 of the yoke. The arm 65, depending from the yoke carrying the cutter head, hangs in front of the sliding sleeve 62, and occupies the same relative position thereto as the depending arm 64. This arm 65, is secured to the yoke with a yielding connection which is illustrated in Fig. 7. A bolt 66, passes transversely through the arm 65, and through one of the vertical portions 33, of the yoke, immediately above its hub 34. Another bolt 67, located above, and extending parallel to the bolt 66, passes through the arm and yoke and is encircled there between by a heavy coiled compression spring 68, see Fig. 7. The opening in the arm through which the bolt 66, passes is tapered so as to permit a pivotal movement of said arm on the bolt.

As will be seen by referring to Figs. 6 and 8, the lower ends of the arms 64 and 65, pass between the flanges on the sliding sleeve 62, and are engaged by the rollers 63, which spread them apart and thus swing the yokes toward each other. The square shaft 59 is rocked by a foot lever 69, which is pivoted at its rear end to a bracket 70 bolted to the rear longitudinal portion of the rectangular form member 1. This foot lever extends transversely beneath the machine and has a foot plate 71, secured to its front end, see Figs. 3 and 4. It is connected to a crank 72 on the rock shaft 59, by a link 73, which has a slot in its upper end through which the crank pin passes. A set screw, in the upper end of the link 73, permits a vertical adjustment of the foot lever. A weighted crank arm 74, secured to the rock shaft 59, near one end, returns said shaft to its normal position after the foot lever 69, has been depressed to rock the same.

In Figs. 6 and 8, the outline of a barrel in cross section is shown in dotted lines, and the crozing and chamfering mechanism and the lance knife are shown in their normal position and in their operative position respectively. By referring to said figures it will be seen that the lance knife is located so as to engage the barrel directly beneath the cutter head, so that a firm support is provided for the barrel staves while the cutting operations are being performed; the rider or stop block 58, supporting the staves from the outside, while the cutter head is operating, and the cutter head itself supporting the staves from the inside so that the lance knife can cleanly trim off the edge of the staves. An adjustable stop is provided to limit the entrance of the cutter head into the staves to a predetermined depth. This stop consists of a set screw 75, which is screwed through the main portion 47, of the lance yoke near its upper end, and which engages with a lug 76, on the cutter head yoke, see Figs. 6, 8, 12 and 13. The rider 58 determines the position of the lance yoke and knife with respect to the outer surface of the barrel, and the stop screw 75, determines the position of the cutter head yoke and cutter head with respect to the lance yoke, so that the great danger, so prevalent in machines of this class, of cutting through the staves when forming the croze, is entirely obviated. This is one of the principal features of the invention. The lance knife is held in engagement with the barrel by means of a weighted bar 77. This bar is fastened to the lance holder 52 by a set screw and carries weights 78. An adjustable stop screw 79, screwed through the lance holder, engages the lance yoke and limits the swinging movement of the lance holder in one direction, see Figs. 6, 7, 12 and 13. The cutter head yoke is weighted so as to withdraw the cutter head from engagement with the barrel upon the release of the foot lever 69; the weight 80, being hung upon the hooked front end of an angular arm 81, which has its rear end passed through an opening in one of the vertical portions 33, of the cutter head yoke, see Figs. 4, 6 and 8.

The forward swinging movement of the cutter head yoke and its mechanism is limited by means of an adjustable stop bar which is illustrated in Figs. 4, 5, 6, 8, 15 and 16. A screw bar 82 has an eye formed at its rear end which encircles a pin 83 projecting laterally from the cutter head yoke. The front end of the screw bar is threaded and enters a threaded sleeve 84 which is supported in a vertical crotch 85, formed integral with the front longitudinal portion 5, of the traveling carriages. This sleeve has a hand wheel 86, on its outer end by means of which it is operated and has a flange 87 formed at an intermediate point which limits the forward movement of said sleeve, see Fig. 6. A jam nut 88, and hand wrench 89 for tightening it are placed upon the screw bar 82, adjacent to the sleeve as shown in Fig. 15. A similar screw bar 90, fastened at its rear end to a pin 91 on the lance yoke and having a threaded sleeve 92, provided with a hand wheel 93, limits the rearward movement of the lance yoke and its mechanism in the same manner as above described.

The two sets of crozing and chamfering mechanisms are moved toward and from each other by a plurality of cranks and connecting rods which are operated by a hand lever. This mechanism is illustrated in Figs. 1, 2, 3, 4, 5 and 21, to which reference will be had in the following description. A transverse shaft or bar 94 extends between the longitudinal side members of the rectangular frame 1, at about the middle thereof, and has its ends supported by bosses and fastened by set screws as shown in Fig. 3. A sleeve 95, loosely encircles the shaft 94, so as to have a rocking movement thereon, and is held against lateral movement by collars 96. This sleeve has two cranks 97 and 98, at one end, which are connected to the carriages supporting the crozing and chamfering mechanisms, by two connected rods 99 and 100, see Fig. 2. The outer ends of these connecting rods pass through openings in depending lugs 101, on the outer transverse portions 6, of the carriages, and are pivotally secured therein by pins 102. The outer ends of the connecting rods 99 and 100, have a plurality of openings to provide for the adjustment of the machine to different sizes of barrels. Each of the pins 102 has a handle 103 attached thereto to facilitate its withdrawal or insertion, see Figs. 4, 6 and 8. A laterally extending pin 104 has one end seated in a boss on the front longitudinal portion of the rectangular frame 1, and supports a sleeve 105 which has a cank 106 at its inner end. This crank 106 is connected with a crank 107 on the rock sleeve 95, by a connecting rod 108, see Figs. 1, 2, 4 and 5. A hand lever 109 is fastened to the sleeve 105 by set screws 110 as shown in Figs. 1, 3 and 5. The head stocks are each provided with a pair of adjustable barrel supports 111 formed as shown in Figs. 3, 4, 5 and 23. They are peferably triangular in shape, are fastened to the retaining rings 21, of the head stock by set screws 112, and can be raised or lowered to accommodate different sizes of barrels. A cover 113, is secured to the back of each head stock, being fastened to the annular flange 18, of the ring 16, by bolts in the manner shown in Fig. 22. This cover has an opening through which the cutter head projects and an adjustable guard 114 is secured to the inside of the cover 113, and shields the cutter head, see Figs. 3, 4 and 5. The head stock is additionally supported from the carriage by a brace rod 115, see Fig. 1.

In Figs. 25 and 26, another method of supporting the lance holder is shown, the holder 116 being supported on cone pointed set screws 117, which enter a lug 118 on the yoke portion 47. The weighted bar holding the lance knife against the barrel, in the construction heretofore described, is dispensed with and this duty performed by a heavy coiled spring 119 which encircles a bolt 120, passed transversely through the yoke and the lance holder. The machine is secured to the floor by vertical bolts 121 which pass through a slot in the transverse portions of the lug members 2 and 3 of the machine frame, see Figs. 2, 4 and 6. This permits the machine to be moved so as to properly tighten the driving belts when the machine is adjusted to operate on a different sized barrel.

The operation of the machine is as follows:—The mechanism being in the position shown in Fig. 1, a barrel is placed upon the supports 111, and the hand lever 109, moved from the position shown in Fig. 1, to the position shown in dotted lines in Fig. 2. This rocks the sleeve 105, and by means of the cranks 106 and 107, and connecting rod 108, moves the sleeve 95 into the position shown in Fig. 2. This movement of the sleeve 95, draws the carriages, and the mechanism carried thereby, toward each other by means of the cranks 97 and 98, and connecting rods 99 and 100, so that the head stocks close over the ends of the barrel, see Fig. 2. The ends of the barrel are frictionally gripped by the annular flanges 20, on the gear rings 19, and the gear rings 19, and the barrel begin to revolve, the gear rings being driven by the pinions 23 on the longitudinal shaft 24. The foot lever 69, is now depressed to rock the shaft 59, which gives a partial rotation to the sleeves 62, and causes the rollers 63, carried thereby, to spread the depending arms 64 and 65, on the swinging yoke. This swings the yokes toward each other, and the lance yokes, being the lighter will move first until the riders 58 strike against the barrel. This movement is permitted by the swinging hangers 60, which allow the rock shaft 59, to swing backward. When the riders strike the barrel the cutter head yokes swing backward so that the mechanisms are in the position shown in Fig. 8. The cutter heads are revolved in a direction opposite to the rotation of the barrel, see arrows in Fig. 3, and the croze cutters 41, and chamfering knives 44, perform their operations. The edges of the barrel staves are then trimmed by the lance knives 55. This operation being completed, the operator releases the foot lever 69, which permits the swinging yokes to recede from the barrel, and then reverses the movement of the hand lever 109, which separates the head stocks and releases the barrel. The barrel is removed and another one placed upon the supports 111, and the operation repeated.

I claim as my invention—

1. In a machine of the class described, a frame, rails on said frame, mechanism slidably mounted on the rails for chamfering, crozing and trimming the ends of a barrel including a carriage, a rock shaft journaled on the carriage, a cutter head for chamfering and crozing the interior of the barrel end supported from the rock shaft by one swinging yoke, a lance knife for finishing the barrel end also supported from the rock shaft and means for rocking said shaft whereby both the cutters and lance knife are simultaneously moved into operative contact with the barrel.

2. In a machine of the class described, a frame, rails on said frame, mechanism slidably mounted on the rails for chamfering, crozing and trimming the ends of a barrel, including a carriage, swinging yokes mounted on the carriage and a cutter head and lance knife supported by the swinging yokes, a rock shaft connected to both the swinging yokes, and means for rocking the shaft and moving the yokes to simultaneously bring both the cutter head and lance knife into operative contact with the barrel.

3. In a machine of the class described, a frame, rails on said frame, mechanism slidably mounted on the rails for chamfering, crozing and trimming the ends of a barrel including a carriage, swinging yokes mounted on the carriage, a cutter head for chamfering and crozing the interior of the barrel end supported by one swinging yoke, a lance knife for finishing the barrel end supported by another yoke and means for moving the yokes to bring the cutter head and lance knife into contact with the barrel.

4. In a machine of the class described, a frame, rails on said frame, mechanism slidably mounted on the rails for chamfering, crozing and trimming the ends of a barrel, including a carriage, swinging yokes mounted on the carriage and a cutter head and lance knife supported by the swinging yokes, a rock shaft connected to the swinging yokes, and means for rocking the shaft and moving the yokes to bring the cutter head and lance knife into contact with the barrel.

5. In a machine of the class described, a frame, rails on said frame, mechanism slidably mounted on the rails for chamfering, crozing and trimming the ends of a barrel, including a carriage, swinging yokes mounted on the carriage, a cutter head and lance knife supported by the swinging yokes and a rock shaft connected to the swinging yokes, means for rocking the shaft and moving the yokes to bring the cutter head and the lance knife into contact with the barrel, and means consisting of a rider and an adjustable stop carried by one of the swinging yokes for limiting the entrance of the cutter head into the barrel staves.

6. In a machine of the class described, a frame, rails on said frame, opposed carriages slidably mounted on the rails and mechanism rotatably supported by the carriages for gripping a barrel placed between them, means for rotating said gripping mechanism, mechanism mounted on the carriages for chamfering, crozing and trimming the ends of the barrel including a rock shaft, swinging yokes connected to the rock shaft, cuttter heads and lance knives supported by the swinging yokes and means for rocking the shaft to move the yokes and bring the cutter heads and lance knives into contact with the barrel.

7. In a machine of the class described, a frame, rails on said frame, mechanism slidably mounted on the rails for chamfering, crozing and trimming the ends of a barrel, including a carriage, swinging yokes mounted on the carriage and a cutter head and lance knife supported by the swinging yokes; manual means for bringing the cutter head and lance knife into contact with the barrel, counterweights for automatically returning the cutter head and lance knife to inoperative position upon the release of the manual means and yielding means for maintaining them in contact, substantially as described.

8. In a machine of the class described, a frame, rails on said frame, opposed carriages slidably mounted on the rails, head stocks rotatably mounted in the carriages between which a barrel may be supported and mechanism mounted on the carriages for chamfering, crozing and trimming the ends of the barrel including a rock shaft, sleeves on the shaft provided with rollers, swinging yokes, cutter heads and lance knives supported by the swinging yokes, arms on the swinging yokes adapted to be operated by the rollers and a foot lever for operating the rock shaft.

9. In a machine of the class described, a frame, carriages slidably mounted in the frame, head stocks rotatably supported by the carriages between which a barrel may be gripped and mechanism mounted on the carriages for chamfering, crozing and trimming the ends of a barrel gripped between the head stocks including an inner cutter head, an end finishing lance knife and a rock shaft, both the cutter head and lance knife being supported from the rock shaft.

10. In a machine of the class described, a frame, rails on said frame, opposed carriages movably mounted on the rails, head stocks rotatably supported in the carriages, means for rotating the head stocks, a lance knife supported from each carriage for finishing the ends of a barrel, and means for swinging said lance knives into contact with the barrel ends.

11. In a machine of the class described, a frame, rails on said frame, carriages movably mounted on the rails, opposed barrel end finishing mechanisms supported by the carriages, including swinging yokes and lance knives supported from the yokes, manual means for swinging the yokes to move the lance knives into operative position, automatic means for moving the lance knives out of operative position when released by the manual means and means for limiting the movement of the swinging yokes in both directions.

12. In a machine of the class described, a frame, rails on said frame, carriages movably mounted on the rails, opposed barrel finishing mechanisms supported by the carriages and including cutter heads, cutter head yokes, lance knives, lance knife yokes supporting the lance knives; said yokes being counterweighted, means for swinging said yokes to move the cutter heads and lance knives into operative position and means for limiting the forward movement of the cutter head yokes and means for limiting the rearward movement of the lance yokes, substantially as described.

13. In a machine of the class described, a frame, rails on said frame, carriages slidably mounted on the rails, barrel end finishing mechanisms supported by the carriages, means for bringing the finishing mechanisms into contact with the barrel ends, including a rock shaft and swinging hangers for supporting the rock shaft.

14. In a machine of the class described, a frame, carriages mounted on the frame, and partially slidable and partially rollable on said frame, between which a barrel is adapted to be gripped and barrel end finishing mechanisms supported by the carriages, substantially as set forth.

EDWIN F. BEUGLER.

Witnesses:
L. M. SANGSTER,
GEORGE A. NEUBAUER.